US007356989B2

(12) United States Patent
Folliot et al.

(10) Patent No.: US 7,356,989 B2
(45) Date of Patent: Apr. 15, 2008

(54) SYSTEM FOR PROVIDING ASSISTANCE IN REGENERATING DEPOLLUTION MEANS

(75) Inventors: Pascal Folliot, Guyancourt (FR); Piet Ameloot, Neuilly sur Seine (FR)

(73) Assignee: Peugeot Citroen Automobiles SA, Velizy-Villacoublay (FR)

( * ) Notice: Subject to any disclaimer, the term of this patent is extended or adjusted under 35 U.S.C. 154(b) by 41 days.

(21) Appl. No.: 11/058,322

(22) Filed: Feb. 16, 2005

(65) Prior Publication Data
US 2005/0188685 A1   Sep. 1, 2005

(30) Foreign Application Priority Data
Feb. 27, 2004   (FR) .................................. 04 02058

(51) Int. Cl.
*F01N 3/00* (2006.01)
*F01N 3/02* (2006.01)
(52) U.S. Cl. ............................. 60/286; 60/295; 60/297; 60/311
(58) Field of Classification Search ............... 60/295, 60/297, 311, 286
See application file for complete search history.

(56) References Cited

U.S. PATENT DOCUMENTS

| | | | |
|---|---|---|---|
| 6,666,020 B2 * | 12/2003 | Tonetti et al. ................ 60/286 |
| 6,739,320 B2 * | 5/2004 | Ito et al. ...................... 123/674 |
| 6,810,858 B2 * | 11/2004 | Ito et al. ...................... 123/478 |
| 6,880,528 B2 * | 4/2005 | Klugl et al. ................. 123/470 |
| 6,948,476 B2 * | 9/2005 | Gioannini et al. .......... 123/299 |
| 6,962,045 B2 * | 11/2005 | Kitahara et al. ............. 60/295 |
| 6,966,304 B2 * | 11/2005 | Nagaishi et al. ............ 123/480 |
| 7,104,050 B2 * | 9/2006 | Sato et al. .................... 60/295 |
| 7,121,250 B2 * | 10/2006 | Yokoyama .............. 123/196 R |
| 7,140,345 B2 * | 11/2006 | Gioannini et al. .......... 123/299 |
| 2003/0168039 A1 | 9/2003 | Ebelsheiser et al. |
| 2004/0139733 A1 * | 7/2004 | Koga et al. ................... 60/280 |

FOREIGN PATENT DOCUMENTS

| | | |
|---|---|---|
| EP | 1 247 969 A2 | 10/2002 |
| EP | 1 357 280 A2 | 10/2003 |
| EP | 1357280 A2 * | 10/2003 |
| EP | 1 361 354 A2 | 11/2003 |
| JP | 10-317936 | 12/1998 |

OTHER PUBLICATIONS

European Patent Office, Patent Abstracts of Japan, Publication No. 2003120390, dated Apr. 23, 2003. Applicant: Toyota Motor Corp. (Cited in the enclosed French search report).

* cited by examiner

*Primary Examiner*—Thomas Denion
*Assistant Examiner*—Loren Edwards
(74) *Attorney, Agent, or Firm*—Nicholas E. Seckel

(57) ABSTRACT

The invention provides a system for providing assistance in regenerating depollution means included in an exhaust system of a motor vehicle engine, the system comprising means for controlling the operation of the engine in order to switch the engine between operation in a standard lean mode and operation in a nominal rich mode for regeneration by using post-injection of fuel into the cylinders of the engine and by modifying at least one engine operation control parameter. The system comprises determination means for determining the fuel dilution level of the engine lubricating oil, monitoring means for monitoring the increase in said dilution level during operation of the engine in nominal rich mode so that when said level reaches a high, first threshold, the operation of the engine is switched to a degraded rich mode in which the fuel dilution of the oil is reduced, or the increase in dilution is slowed down, by modifying at least one operating control parameter of the engine, and monitor means for monitoring said reduction so that when the dilution level reaches a low, second threshold, the operation of the engine is switched back into nominal rich mode.

5 Claims, 2 Drawing Sheets

SYSTEM FOR PROVIDING ASSISTANCE IN REGENERATING DEPOLLUTION MEANS

The present invention relates to a system for providing assistance in regenerating depollution means integrated in an exhaust system of a motor vehicle engine.

BACKGROUND OF THE INVENTION

It is known that such depollution means can include, for example, a NOx trap which is a system for reducing polluting emissions from motor vehicle engines.

The engine is then associated with means for controlling its operation to switch said operation between a standard lean mode of operation and a nominal rich mode of operation for regeneration, depending on various engine operation control parameters.

In the standard lean mode of operation, the NOx trap stores NOx, and once the trap has become saturated, regeneration thereof is triggered by switching the engine to operate in its rich mode of operation in order to destock the NOx, in which mode the engine produces reducing agents such as CO and HC, for example.

In conventional manner, this is performed by modifying at least one engine operation control parameter, i.e. at least one parameter relating to the injection of fuel into the engine (quantity, timing phase, pressure, etc. . . . ) and/or at least one parameter of the engine air feed loop (air flow rate, recycling, turbocompressor pressure, etc. . . . ).

In particular, during this operation of the engine in its nominal rich mode for regeneration, use is made of post-injection of fuel into the cylinders of the engine. Likewise, the engine is operated with post-injection for the purpose of regenerating a particle filter included in the exhaust system.

Post-injection is injection of fuel after top dead center (TDC).

Unfortunately, such post-injection leads to the engine lubricating oil being diluted by the fuel that is post-injected into the engine.

Oil becomes diluted because post-injection takes place late in the engine cycle and a large fraction of the fuel is then injected against the walls of the combustion chamber.

A tiny fraction of the fuel then passes into the sump via the piston ring.

Consequently the lubricating oil becomes diluted with fuel.

Such dilution of the oil can lead to a loss of oil viscosity and thus of oil pressure, giving rise to premature aging or indeed dilution of additives present in the oil.

OBJECT AND SUMMARY OF THE INVENTION

The object of the invention is thus to solve these problems.

To this end, the invention provides a system for providing assistance in regenerating depollution means included in an exhaust system of a motor vehicle engine, the system comprising means for controlling the operation of the engine in order to switch the engine between operation in a standard lean mode and operation in a nominal rich mode for regeneration by using post-injection of fuel into the cylinders of the engine and by modifying at least one engine operation control parameter, wherein the system comprises determination means for determining the fuel dilution level of the engine lubricating oil, monitoring means for monitoring the increase in said dilution level during operation of the engine in nominal rich mode so that when said level reaches a high, first threshold, the operation of the engine is switched to a degraded rich mode in which the fuel dilution of the oil is reduced, or the increase in dilution is slowed down, by modifying at least one operating control parameter of the engine, and monitor means for monitoring said reduction so that when the dilution level reaches a low, second threshold, the operation of the engine is switched back into nominal rich mode, and wherein the depollution means further comprise a particle filter whose operation requires the engine to operate in a mode with post-injection.

According to other characteristics:
- the means for determining dilution level comprise a dilution sensor;
- the means for determining dilution level comprise means for estimating said level from maps of fuel dilution of oil and of fuel evaporation during operation of the engine in its various modes, and on the basis of the length of time the engine has been operating in each mode; and
- it further includes fuel evaporation means, with operation thereof being triggered by the monitor means when the dilution level of the oil reaches the high, first threshold.

BRIEF DESCRIPTION OF THE DRAWINGS

The invention will be better understood on reading the following description given purely by way of example and made with reference to the accompanying drawings, in which.

MORE DETAILED DESCRIPTION

Figure 1:
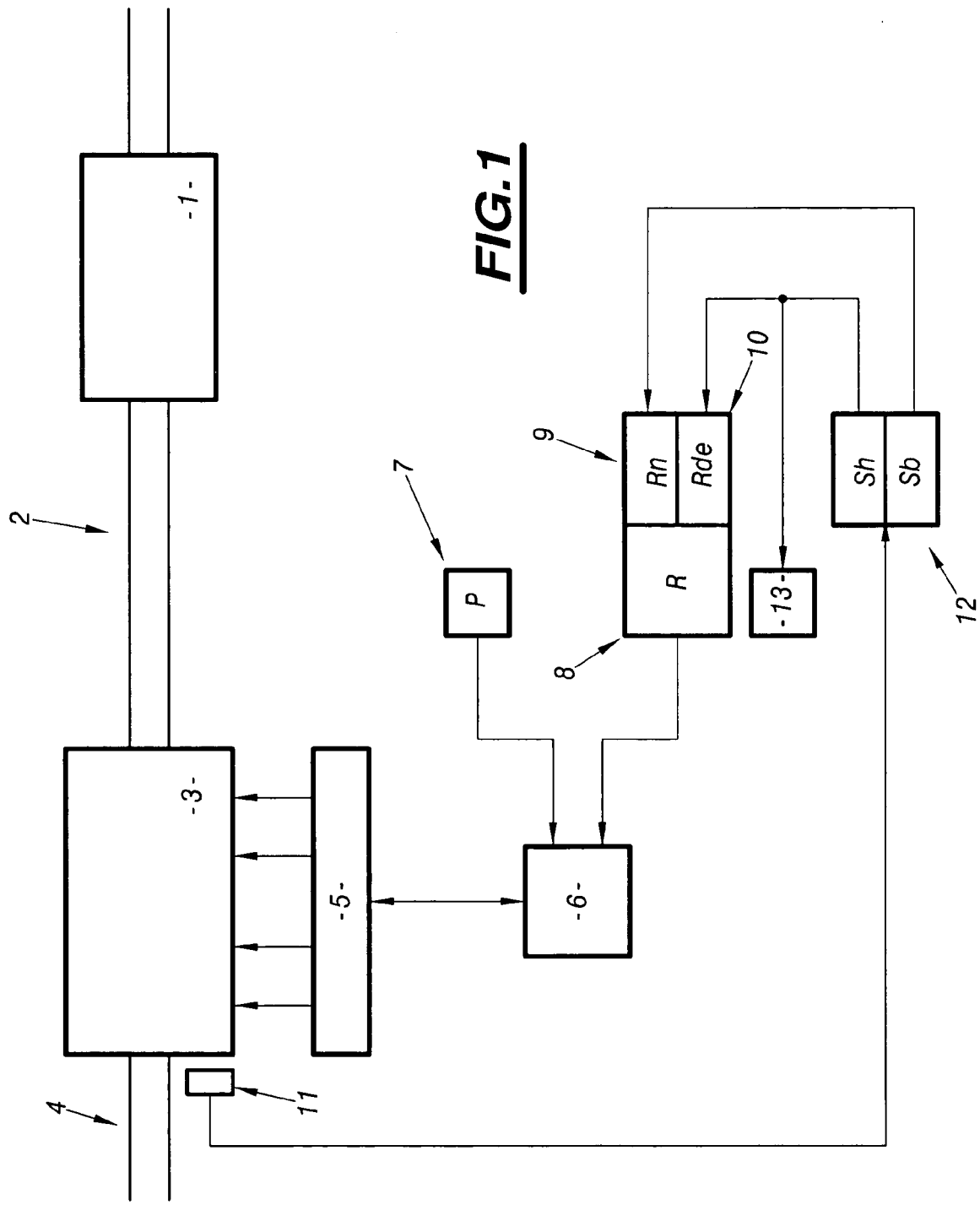
FIG. 1 is a block diagram showing the structure and the operation of an assistance system of the invention.

These figures, and in particular FIG. 1, show a system for providing assistance in regenerating depollution means, which system is given overall reference 1 in said figure, and is integrated in an exhaust system 2 of a motor vehicle engine 3, for example.

The engine is also associated with air feed means given overall reference 4, and with means for controlling its fuel feed given overall reference 5, e.g. comprising a common strip for feeding injectors for injecting fuel into the cylinders of the engine.

The operation of these means is controlled by control means given overall reference 6.

By way of example, the depollution means comprise a NOx trap and the control means 6 are then adapted to cause the operation of the engine to switch over between operation in a lean standard mode and operation in a rich regeneration mode in compliance with various parameters for controlling the operation thereof.

In particular, post-injection of fuel into the cylinders of the engine is then used in conventional manner.

By way of example, these parameters are the parameters represented by references 7 and 8 respectively in the figures.

The parameters 7 are used for controlling the engine in its lean standard mode of operation, while the parameters 8 are used for controlling the engine in its rich regeneration mode of operation.

The parameters 8 comprise two sets of parameters, i.e. sets 9 and 10, one corresponding to a set of parameters for operation of the engine in a nominal rich mode and the other to a set of parameters for operation of the engine in a degraded rich mode, based on a map in order to reduce the extent to which the lubrication oil of the engine is diluted by the fuel fed to the engine.

It can thus be understood that the parameters 9 serve to obtain nominal operation of the engine in rich mode and thus to obtain optimum regeneration of the depollution means.

The parameters 10 serve to minimize the extent to which oil is diluted by fuel, e.g. fuel that has been post-injected, while still maintaining some level of regeneration activity.

These various parameters are pre-established and may be presented, for example, in the form of dilution maps.

In degraded rich mode, it is thus possible, for example, to rely more on operating points that lead to the least possible dilution or to reduce the frequency with which rich mode is used, while nevertheless complying with some minimal level of regeneration effectiveness for the depollution means.

For this purpose, the system of the invention also includes means for determining the extent to which the engine lubricating oil has been diluted by the fuel fed thereto.

These means may be presented in various ways.

Thus, for example, in FIG. 1 these means are presented in the form of a sensor given overall reference 11 which serves to measure the quality of the oil, and this information relating to oil quality is used to adapt the strategies for controlling operation of the engine and thus for regeneration of the depollution means.

For this purpose, the system further includes means 12 for monitoring variation in said oil dilution level in order to adapt its strategy.

Thus, for example, these monitoring means are adapted to monitor an increase in dilution level while the engine is operating in nominal rich mode in application of the parameters 9, so that when the dilution level reaches a high, first dilution threshold marked Sh in the figure, operation of the engine is switched over to degraded rich mode in application of the parameters 10 so as to reduce oil dilution or to slow down the rate at which the oil is diluted by the fuel, by modifying at least one engine operation control parameter, and to monitor the reduction in dilution level while the engine is operating in degraded rich mode so that when said dilution level reaches a low, second threshold, referenced Sb in FIG. 1, the operation of the engine is switched back into nominal rich mode in application of the parameters 9.

Furthermore, fuel evaporator means given overall reference 13 in FIG. 1 can also be envisaged and put into operation when the dilution level reaches the high first threshold Sh in order to further accelerate reduction in the dilution level.

Figure 2:
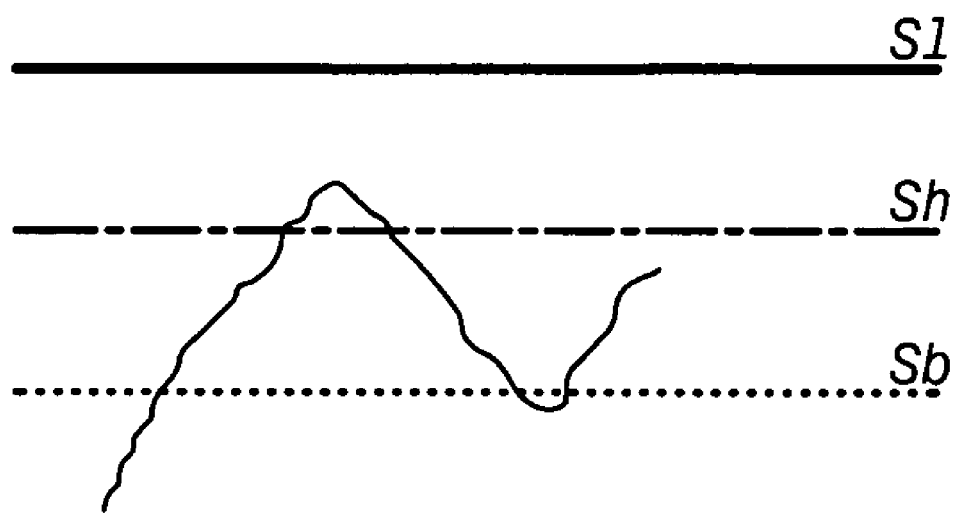
FIG. 2 shows a curve illustrating variation in an oil dilution level.

It will be understood that by means of such a structure, and as shown in FIG. 2, it is possible to maintain the extent to which the oil is diluted below a limit threshold referenced S1 in FIG. 1, so as to ensure that the oil retains its lubricating quality.

As mentioned above, the determination means may comprise a dilution sensor.

In another embodiment, the determination means may comprise means for estimating oil dilution on the basis of maps of oil dilution by fuel and of fuel evaporation as apply during operation of the engine in the rich and lean modes.

These estimator means then keep the value for oil dilution level up to date as a function of various engine operating parameters such as, for example: engine speed, load, temperature, etc. The dilution value can then be used for adapting strategies for regenerating the depollution means or for alerting a user of the vehicle and advising the user to have an oil change.

These estimator means then make use of maps of oil dilution and fuel evaporation, e.g. on an hourly basis, and calculate the accumulated dilution level as a function of the duration of engine operation in such-and-such a mode of operation.

Naturally, other embodiments could also be envisaged.

For example, a particle filter could be included in the exhaust system. The particle filter also requires the engine to operate in a mode that includes post-injection different from rich mode and likewise leading to dilution of the oil, which dilution needs to be taken into account.

What is claimed is:

1. A system for providing assistance in regenerating depollution means included in an exhaust system of a motor vehicle engine, wherein the depollution means further comprise a particle filter whose operation requires the engine to operate in a mode with post-injection, the system comprising:
    means for controlling the operation of the engine in order to switch the engine between operation in a standard lean mode and operation in a nominal rich mode for regeneration by using post-injection of fuel into the cylinders of the engine and by modifying at least one engine operation control parameter,
    determination means for determining the fuel dilution level of the engine lubricating oil,
    monitoring means for monitoring the increase in said dilution level during operation of the engine in nominal rich mode so that when said level reaches a high, first threshold, the operation of the engine is switched to a degraded rich mode in which the fuel dilution of the oil is reduced, or the increase in dilution is slowed down, by modifying at least one operating control parameter of the engine, whereas the operation of the engine during the standard lean mode is not modified as a function of fuel dilution of the oil, wherein the at least one modified operating control parameter of the engine includes a frequency with which rich mode is used, and
    monitor means for monitoring said reduction so that when the dilution level reaches a low, second threshold, the operation of the engine is switched back into nominal rich mode.

2. A system according to claim 1, wherein the means for determining dilution level comprise a dilution sensor.

3. A system according to claim 1, wherein the means for determining dilution level comprise means for estimating said level from maps of fuel dilution of oil and of fuel evaporation during operation of the engine in its various modes, and on the basis of the length of time the engine has been operating in each mode.

4. A system according to claim 1, further including fuel evaporation means, with operation thereof being triggered by the monitor means when the dilution level of the oil reaches the high, first threshold.

5. A system according to claim 1, wherein the at least one modified operating control parameter of the engine includes the post-injection of fuel into the cylinders of the engine.

* * * * *